US006148482A

United States Patent [19]

Maraman, Jr.

[11] Patent Number: 6,148,482

[45] Date of Patent: Nov. 21, 2000

[54] GRIP APPARATUS AND METHOD

[75] Inventor: N. Davis Maraman, Jr., Salt Lake City, Utah

[73] Assignee: Thoroughbred LC, Riverside, Utah

[21] Appl. No.: 09/079,969

[22] Filed: May 15, 1998

[51] Int. Cl.[7] ................................ A47J 45/00; E05B 1/00

[52] U.S. Cl. ........................ 16/421; 16/430; 16/DIG. 12; 81/177.1; 81/489

[58] Field of Search ............................. 16/421, 422, 430, 16/431, DIG. 12, DIG. 19; 81/177.1, 489

[56] References Cited

U.S. PATENT DOCUMENTS

| | | | |
|---|---|---|---|
| 2,701,379 | 2/1955 | Balistreri | 16/421 |
| 3,752,202 | 8/1973 | Condon | 145/61 L |
| 4,284,275 | 8/1981 | Fletcher | 473/549 |
| 4,785,495 | 11/1988 | Dellis | 16/111 R |
| 4,932,800 | 6/1990 | Lin et al. | 401/6 |
| 4,934,024 | 6/1990 | Sexton, I | 16/111 R |
| 4,953,862 | 9/1990 | Uke et al. | 273/75 |
| 4,974,286 | 12/1990 | Stowell et al. | 16/111 R |
| 5,042,804 | 8/1991 | Uke et al. | 273/75 |
| 5,062,816 | 11/1991 | Berglund et al. | 440/101 |
| 5,348,360 | 9/1994 | Mencarelli et al. | 16/421 |
| 5,365,637 | 11/1994 | Bodell et al. | 16/431 |
| 5,390,572 | 2/1995 | Gakhar et al. | 81/436 |
| 5,556,092 | 9/1996 | Theken | 16/436 |
| 5,634,859 | 6/1997 | Nesbitt | 473/301 |
| 5,730,662 | 3/1998 | Rens | 473/300 |
| 5,740,586 | 4/1998 | Gomas | 16/111 R |
| 5,860,190 | 1/1999 | Cano | 16/422 |
| 5,926,912 | 7/1999 | Claphan | 16/421 |

OTHER PUBLICATIONS

Stephan Witte GmbH & Co. KG, "Protop Screwdrivers" Product Brochure (Mar. 1997).

*Primary Examiner*—Chuck Y. Mah
*Attorney, Agent, or Firm*—Madson & Mewtcalf

[57] ABSTRACT

A grip for a tool handle or other surface intended for gripping by a user, may be provided by a durable, expanded elastomeric material. Formation of the grip, and installation thereof on a handle may be effected to provide pre-loading of a normal force against the handle, requiring substantially less normal force by a user on order effect frictional engagement of a handle by the grip. The grip may also be formed to provide micro-pressure along ridges impressed into the hand of the user alternating with cavities in a surface of the grip for receiving intrusions of the hand. Thus, mechanical engagement, rather than strictly frictional engagement may be effected. Grips made in accordance with the invention have been demonstrated to provide sufficient engagement with a hand and a tool handle to permit a user to apply the maximum physical force available from the user. Limitations on the ability to act on a workpiece by a tool secured to the handle and grip is limited by the durability of the workpiece, the durability of the metal engagement portion of the tool, and not by the frictional engagement of the tool and the handle, and not by the engagement of the grip by the hand of a user.

6 Claims, 10 Drawing Sheets

GRIP APPARATUS AND METHOD

BACKGROUND

1. The Field of the Invention

This invention relates to hand tools and, more particularly, to novel systems and methods for constructing, applying, and using grips for applying torque to tool handles.

2. The Background Art

Hand tools are still a part of the daily life of many professionals as well as home users. Hand tools come in a variety of shapes, sizes, purposes, and constructions. Tools are a part of every job performed by every person in the world. Tools may include computers, machine tools, power tools, automated tools, hand tools, needles, papers, files, and so forth. Tools of an individual's trade may be interpreted to mean those "things" that a person requires in order to work, work more efficiently, and the like.

Tools that are adapted to apply energy to a workpiece may be thought of as traditional tools. For example, hammers, saws, screwdrivers, wrenches, chisels, and the like are common hand tools. Every profession relying on hand work may have an assortment of available tools.

Power tools may be thought of as tools requiring a power source in addition to a human user, which power source drives some element of the tool. For example, power saws, pneumatic nail drivers, staplers, drills, power screwdrivers, impact wrenches, and so forth, are all examples of power tools that may be free-standing or portable. Tools may be held by a user or merely guided or controlled by a user.

Whenever a user of any tool is required to maintain a grip on the tool in order to effect its use, risks arise. Risks may involve improper functioning of a tool. Risks may involve improper guidance, control, or skill in using a tool. Many risks associated with tools may relate directly to a user's ability to maintain a secure grip on a handle or handle portion of a tool of any variety. Control of the tool, safety of the tool, safety of users and bystanders from damage inflicted by a tool, effective operation of a tool on a workpiece, and protection of a workpiece from damage due to failure of control of a tool, may all be dependent upon the quality of control that may be exerted by a user on a handle of a tool.

Tool handles have been the subject of developments since time immemorial. The shape of many handles on work tools, weapons, game tools (racquets, bats, etc.), as well as a host of other "tools" have handles adapted to the nature of the use of the tool and the nature of the grip of a user applied to the handle of the tool.

Several major difficulties arise in practice with respect to tools and tool handles. Fatigue plagues every user of a tool. Long use, the rigidity and shape, and other factors relating to handles may affect the level of fatigue experienced by a user required to grip a handle of a tool. Likewise, a user may sweat according to a level of exertion or environmental temperature and the like. Moisture between a hand of a user and a handle of a tool reduces the friction available between the surface of the hand and the surface of the handle.

What is needed is an improved grip that may be universally applied to tool handles in a variety of tools. By tools may be included all implements having a handle or handle portion that should or must be gripped by a user for proper control or operation. Thus, a tennis racquet is a tool, as is a golf club. Moreover, a hand screwdriver, or a hammer is a tool as is a power saw, power drill, impact wrench, and so forth.

Two of the most difficult circumstances for controlling a tool involve application of torque and thrust. Torque may be thought of as rotating a handle or handle portion, typically using a wrist flexure to rotate circumferentially in the direction of fingers wrapped around a handle.

Thrust may be thought of as urging a handle in a longitudinal direction such as across the palm of the hand of user, transverse to fingers wrapped around a handle. Typically, a motion of an arm or forearm may be used. In thrusting a tool, full body weight, shoulder strength, and the like may be applied to a handle of a tool through a hand of a user gripping the tool. One may understand that the grip of a hand of a user applied to a tool handle is critical. If a tool handle has a smooth surface, the grip in torsion or thrust is controlled by the coefficient of friction, normal force, and resulting frictional force applied by a user.

Various mechanisms have been implemented to improve the ability of a user to grip a handle effectively. Contouring a handle to fit on and around fingers is a classical example of attempting to overcome the limitations of friction between a hand of a user and a handle of a tool. Adhesives and other tacky or sticky materials have been applied to handles as well. Applying chalk and other dehydrating materials to handles is another mechanism used to improve the effective grip of a user on a handle.

User comfort affects the ability to operate a tool without pain, as well as the ability to operate a tool with a minimum of fatigue. As a practical matter, user comfort in securely holding a handle is a matter of substantial concern to virtually all manufacturers of tools (e.g. toys, sporting equipment, work tools, hand tools, power tools, etc.).

One approach to comfort is contouring the shape of a handle to fit a user, however, users come in different sizes. Tools are also used in a variety of positions. A single, solid, contoured surface is effective to some extent. However, in the application of many tools to a workpiece, contoured grips are not universally effective.

Another approach to improving user comfort in order to reduce fatigue involves padding. Leather, plant fibers, synthetic materials, and the like have been added to absorb moisture from a hand of a user, distribute stress over the skin surface of a user gripping the handle and so forth.

Each method for providing a comfortable gripping surface for a user may provide certain benefits with certain costs, and often specific limitations. For example, leather may eventually become slippery. Cleaning leather is problematic. Knurling is expensive and actually produces great localized stress and discomfort to the hand of a user with extended use, and synthetics have proven to be largely ineffective in many applications.

For example, plastic is not so cold as steel in cold environments nor as hot in hot environments. Moreover, plastics may be lighter than metals and less expensive. Rubber and other elastomeric materials, whether natural or synthetic are problematic when formed as continuous solid materials. Typically, elastomeric materials are somewhat improved over rigid materials such as metals and hard plastics, but eventually fail to maintain grip capacity when moistened. Resilience may be adequate for durability but engagement by a user is typically inadequate. That is, elastomeric materials are usually too stiff if solid and too soft if expanded.

Alternatively, urethane foams have been used in recent years. Urethane foams may improve comfort. However, the stiffness of foam materials applied to handles today is typically only for comfort and distribution of stress in a normal direction with respect to the surface of a hand user or the surface of a tool handle. It is usually completely inadequate for applying a torque effectively and is not designed to do so. Expanded polymeric materials, particular expanded elastomeric polymers, typically have a sufficiently high void fraction and a significantly small modulus of the elasticity, that torque applied to handle can completely reduce the expanded material to a size limited only by conservation- of-mass principles.

What is needed is a grip adaptable to a variety of handles of tools. The grip needs to provide a comparatively high void fraction and a comparatively high stiffness as compared with conventional urethane foams used in exercise equipment, tools, and the like. The grip needs to be shaped suitably for achieving excellent torque and thrust properties even without specialized shaping, such as contouring, to the hand of a user or providing barriers in a direction of motion or force (like the thumb rest or hilt on a screwdriver, for example) a material needs to be considerably more durable than conventional elastomeric materials such as dipped vinyls, urethane foams, and the like, which can be easily torn, separated from the tool handle, or reduced to ineffectiveness by application of the forces which a user is capable and desirous of delivering to a workpiece.

BRIEF SUMMARY AND OBJECTS OF THE INVENTION

In view of the foregoing, it is a primary object of the present invention to provide a grip for adapting a tool handle to a hand of a user. A grip is needed that will be sufficiently stiff to transfer torque directly to a tool handle, or thrust, to a maximum extent. Fatigue to a user needs to be reduced. The durability, resilience, and the like should be optimized, typically increased substantially. Moreover, the actual effective load that may be applied in thrust or torque to a handle of a tool should be limited only by the actual physical strength of a user, a tool body, or the workpiece. The grip should not be the load-limiting factor in application of force between a user and a workpiece.

Consistent with the foregoing objects, and in accordance with the invention as embodied and broadly described herein, an apparatus and method are disclosed, in suitable detail to enable one of ordinary skill in the art to make and use the invention. In certain embodiments, an apparatus and method in accordance with the present invention may include an annular grip having an inner cavity for receiving a tool handle, with an outer surface that is selectively deformable to an extent necessary to apply and fully resolve torque and thrust loads applied by the hand of a user, converting those loads directly into loads into the tool handle.

An apparatus and method in accordance with the invention provide a comparatively high density of expanded elastomeric material, preferably at a closed cell type. A substantial void fraction may be selected to provide a proper balance between deformation, stiffness, dimensional stability, friction, and mechanical, interstitial engagement between the surface of a hand of a user, and the surface of the apparatus (e.g grip).

The deflection, deformation, or distortion of the grip are designed to be sufficient to provide an actual, normal, surface engagement between a hand of a user and the grip (apparatus). The grip, limiting such deflection or distortion to that amount required may provide a modulus of elasticity and an effective modulus of elasticity of the expanded elastomeric material sufficient to transfer all torque and thrust forces from the hand of a user to the tool handle. This response is obtained rather than the grip being distorted to release the hand, resulting in an inadequate frictional contact; and, instead of stiffly resisting compression radially, it fails to transfer torque because of slipping of the frictional handle surface.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 16, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

One of ordinary skill in the art will, of course, appreciate that various modifications to the details of the Figures may easily be made without departing from the essential characteristics of the invention. Thus, the following description of the Figures is intended only by way an example, and simply illustrates certain presently preferred embodiments consistent with the invention as claimed.

Figure 1:
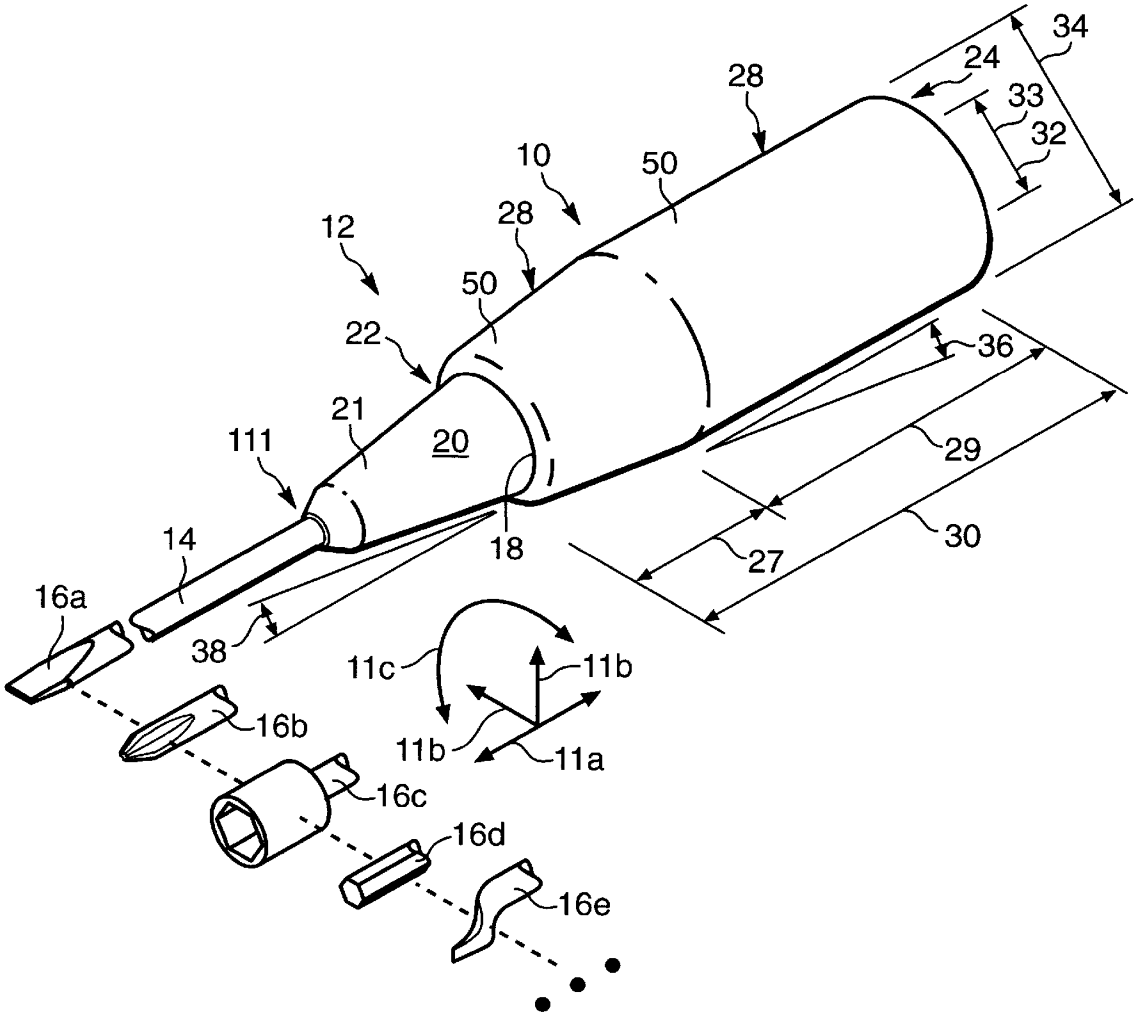
FIG. 1 is a perspective view of an apparatus in accordance with the invention.

Referring to FIG. 1, a grip 10 may be formed to improve the ability of a user to effectively maintain control of a tool 12. A grip 10 may be formed to have a longitudinal direction 11*a*, a radial direction 11*b*, and a circumferential direction 11*c*. As a practical matter, a tool 12 may be rectangular, circular, or may have any other shape adapted to the purpose of the tool 12 or a body member of a user. Nevertheless, as a practical matter, many tools 12 may have a rounded aspect in their handles 20. A handle 20 need not be a right circular cylinder. Nevertheless, rounded objects, oval objects, and the like are often adapted to being gripped by a hand of a user. Accordingly, a grip 10 may have the directions 11 identified. A radial coordinate system, spherical coordinate system, or Cartesian coordinate system in linear dimensions may be selected.

The apparatus 12 may include a shaft 14 or other mechanism for applying a load in a direction 11, selected by a user, to effect operation of a tool 16 or tip 16 adapted to operate on a workpiece. Each of the tips 16*a*–16*e* is illustrated by way of example. Numerous types of tools, functions, and the like may be adapted to operation by a shaft 14.

For example, a chisel-point screwdriver tip 16*a*, a Phillips-type screwdriver tip 16*b*, a nut-driver 16*c*, an internal-cavity-head wrench 16*d*, such as a torx, Allen, or other specialized wrench 16*d*, a reaming tool 16*e*, and the like are merely examples. Nevertheless, a shaft 14 may be sized (and even threaded) as appropriate to connect to a power tool, an apparatus, a structure, or the like to provide support for a user gripping the grip 10 or to be controlled by a user gripping the grip 10.

The grip 10 may share a contact surface 18, a theoretical surface in space at which a handle 20 and the grip 10 may meet. The grip 10 may be thought of as having a head 22 or head end 22 and a base 24 or base end 24.

In one embodiment of an apparatus and method in accordance with the invention, a tool 12 may be formed to receive a grip 10, over a handle 20 in an interfering arrangement. A tapered portion 26 of a grip 10 may provide a much easier entry, retrieval, and deeper purchase in a pocket or holster of a tool belt or tool pouch. Accordingly, the grip 10 may be formed to have a tapered portion 26, having a suitable length 27 selected for the appropriate functionality of the tool 12. In one presently preferred embodiment, a straight portion 28 of a suitable length 29, selected for an appropriate tool 12, may extend for receiving the hand of a user therearound. The overall length 30 may be a combination of the tapered length 27, straight length 29 or combination of multiple lengths 27, 29 for a variety of tapered portions 26 and straight portions 28, adapted to a particular function of a tool 12 or apparatus 12.

A diameter 32 of a grip 10 may be selected to receive the handle 20. In one embodiment, the diameter 32 may be selected to fit exactly over a diameter 33 of the straight portion 28 of the handle 10. Alternatively, in one presently preferred embodiment, a substantial interference is provided between the outside diameter 33 of the handle 20 and the inside diameter 32 of the grip, when the inside diameter 32 is completely relaxed, or free of radial and circumferential stress.

The diameter 34 around the outside of the straight portion 28 may be designed to remain constant, in spite of compression of the grip 10 in response to radial pressure from the handle 20, or may be expanded due to the material properties and interference between the handle 20 and the grip 10, following assembly.

As a practical matter, the angle 36 on the tapered portion 26 of a grip 10 may be constant or may vary in a circumferential direction 111*c*. In one embodiment, a turning operation may be used to work the grip 10 in order to form the tapered portion 26. In such an embodiment, a tapered portion 26 may be conical in shape and constant at any longitudinal 111*a* position along the length 30.

The angle 38 corresponding to the handle 20, or more particularly the tapered portion 21 thereof, may be identical to the angle 36. One advantage of identical angles 36, 38 is that a pocket will tend to conform to a single angle, for a surface receiving and capturing the tool 12. Accordingly, some rounded working along the head end 22 of the grip 10 may form a smoother transition for easy insertion of the tool 12 into a pocket.

For example, the shaft 14 enters a pocket or loop first, followed by the tapered portion 21 of the handle 20, and the tapered portion 26 of the grip 10. A tool 12 made in accordance with the invention may ride two or more inches deeper in a pocket of a carrying belt or carrying harness, than conventional tools having handles 20 that are not tapered. The tapered portion 21 of a tool 12, and particularly the handle 20, is not typical.

The grip 10 is so much more effective in the hands of a user than conventional tools with their varieties of handles, that no need exists for a shank or thrust member, appearing like a hilt at the head end 111 of the handle 20. The outer diameter 33 of the handle 20 near the head end 111 of the tapered portion 21 is substantially smaller than that of conventional tools. In fact, conventional tool handles typically have a thrust member or shank as a thumb rest at the head end 111 of a handle 20, extending a diameter 33 equal to the outer diameter 34 of the entire apparatus 12. In a tapered aperture of a pocket, one may see that the straight portion 28 of the grip 10 may actually ride or be positioned at a location that would normally be occupied by a shank or hilt of a conventional tool handle 20.

Figure 2:
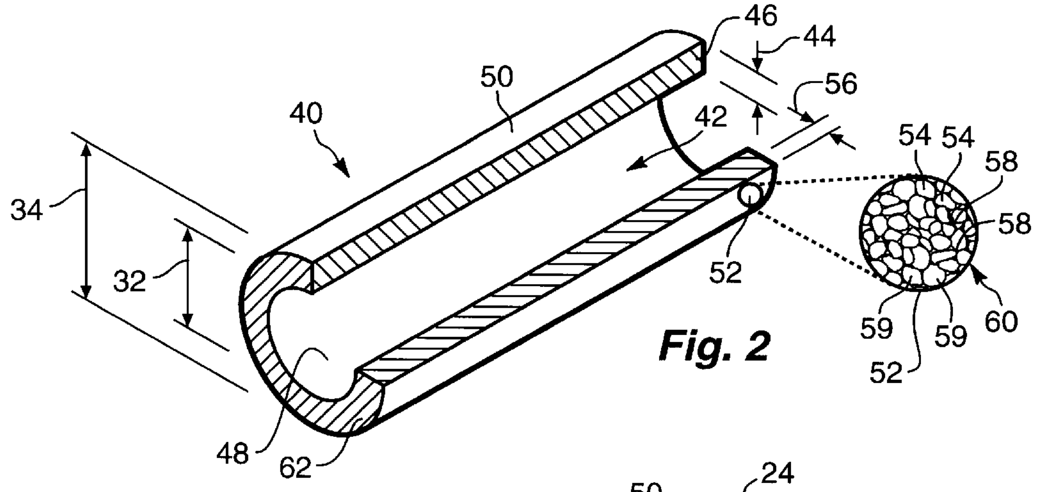
FIG. 2 is a partially cutaway, perspective view of one embodiment of a grip and blank configuration of an apparatus in accordance with the invention.

Referring to FIG. 2, alternative embodiments 40, 66, 68 of grips 10 are illustrated, by way of example, and not limitation. A grip 40 may also be referred to as a blank 40. In one presently preferred embodiment of an apparatus and method in accordance with the invention, a blank 40 may be manufactured as a right circular cylinder. Such a blank 40 may actually operate as a completed grip 10.

Alternatively, the grip 40 may be worked to improve selected properties. Also, the blank 40 may be made as an extrusion, or other die-formed shape. Injection molding and other batch-type processes may be used. However, extrusion is a particularly economical method for manufacturing a blank 40 from an extrudable material, such as an expanded, elastomeric, polymeric material. In one embodiment, the blank 40 may be formed from a compound of which the major constituent is neoprene.

The blank 40 may be formed to have an inner cavity 42. The inner cavity 42 may be sized to receive the handle 20. Accordingly, a wall thickness 44 of the annulus 40 or blank 40 may be selected to provide the appropriate amount of compression, tension, deflection, resilience, section modulus in any particular direction, or about any particular axis of thickness 44 in a longitudinal direction 11*a* (see FIG. 1). Alternatively, the wall 46 may be worked to provide an inner surface 48 effective to grip with friction against the handle 20, while an outer surface 50 is worked to interface better with the hand of the user.

For example, the outer surface 50 may be worked to change the particular cross-section of the blank 40. Alternatively, the cross-section may remain substantially identical, while the outer surface 50 is merely worked to open a closed-cell, elastomeric, extruded, polymeric blank 40 in order to interact better with the hand of a user.

In one embodiment, the material of which the blank 40 is formed may appear as the section 52 or area 52 expanded schematically in FIG. 2. The section 52 is comprised of numerous cavities 54. The cavities 54 may be thought of as voids or bubbles formed in an expanded polymeric material. Each cavity 54 may extend a depth 56. The depth 56 may vary with the particular size of a specific cavity 54 in the overall bulk of material in the blank 40.

Nevertheless, each cavity 54 is formed to have a boundary 58 that eventually becomes a ridge 58 in the surface 50 of the blank 40 or grip 10. A cavity 54 surrounded by the ridges 58 or boundaries 58 may be thought of as a cell 60. In one presently preferred embodiment, the blank 40 may be extruded as a closed-cell, elastomeric structure. Thus, deflection may be elastic and resilience may be complete in response to application and release of a load against a surface 50.

In one presently preferred embodiment, closed-cell, expanded, polymeric material may be worked to form a convoluted surface 50, comprised of the cells 60 formed by the ridges 58 and the closed surfaces 59 contiguous with the ridges 58 forming the cells 60. In one embodiment, one may think of the cells 60 as bubbles or balloons, with the ridges 58 merely being shared surfaces 59 or walls 59 that happen to be oriented substantially orthogonally with respect to the theoretical surface 50, or envelope. That is, a surface 50 may be a smooth surface on an extruded blank 40. Nevertheless, the surface 50, after working to open the cells 60, becomes a highly structured web of cells 60, and voids 54, and ridges 58 accessible for intrusion by the tissue and skin of the surface of the hand of a user.

In one embodiment of an apparatus and method in accordance with the invention, opening closed cells 60 by working a surface 50 of a blank 40 may be very effective to improve the torsional loads that a user may apply to a handle 20 through a grip 10. If an extrusion is used to form the blanks 40, then a parting surface 62 or parting-off surface 62 may be formed in a particular, desirable shape as each individual grip 10 or blank 40 is removed. In one presently preferred embodiment, a blank 40 may be made in extremely long lengths to be alternately chucked and advanced throughout the face of a turntable (e.g lathe chuck) to be worked across a surface 50 and then parted off at a suitable parting surface 62. The parting surface 62 need not be perpendicular to a longitudinal direction 11*a*.

Figure 3:
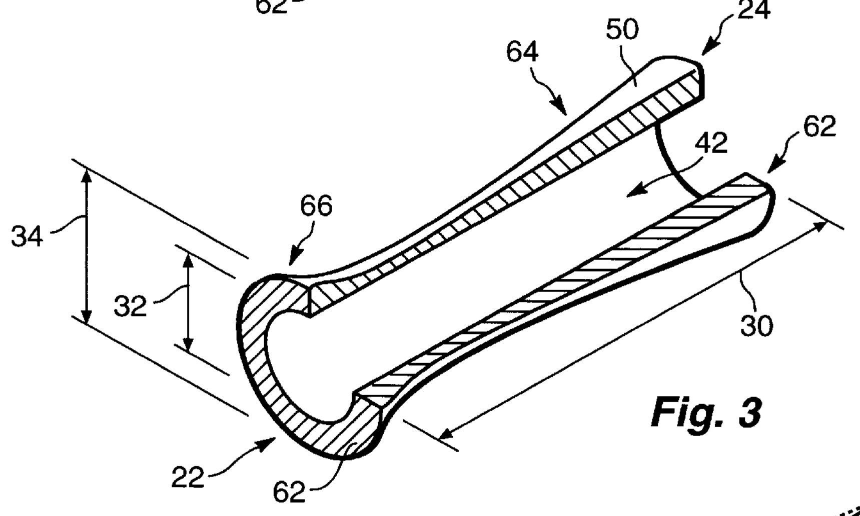
FIG. 3 is a partially cutaway, perspective view of an alternative embodiment of a shaped apparatus in accordance with the invention.

Referring to FIG. 3, specifically, and generally to FIGS. 1–6, an alternative embodiment 64 of a grip 10, 64 may contain a shank 66, a thumb rest 66. However, in certain presently preferred embodiments, a thumb rest 66 or shank 66 may be undesirable. For example, users of hand tools often carry an apparatus 12 or tool 12 in a work belt, holster, pocket, or the like.

Meanwhile, friction for thrust in a longitudinal direction is poor in prior art handles due to the small fraction of radial gripping force applied by the user. Coefficients of friction are often much less than unity. A shank 66 or a thumb rest 66 exists in order to provide thrust from a thumb of a user 11*a* to the grip 10.

As a practical matter, the value of the diameter 34 typically trimmed or reduced between the head end 22 and the base end 24 of the grip 64, is removed to provide relief for positioning a thumb against the thumb rest 66. Therefore, the thumb rest 66 may have a corresponding maximum diameter 34 approximately equivalent to the maximum diameter 34 of the grip 64 at the base end 24 or elsewhere. Thus, the large diameter 34 at the head end 22 limits the penetration of the grip 10, 64 and the associated, entire, assembled tool 12 into a pocket of a tool belt, apron, holster, loop, or the like. Thus the tool 12 having a shank 66 is more likely to fall out of a holder, being less deeply engaged.

Figure 4:
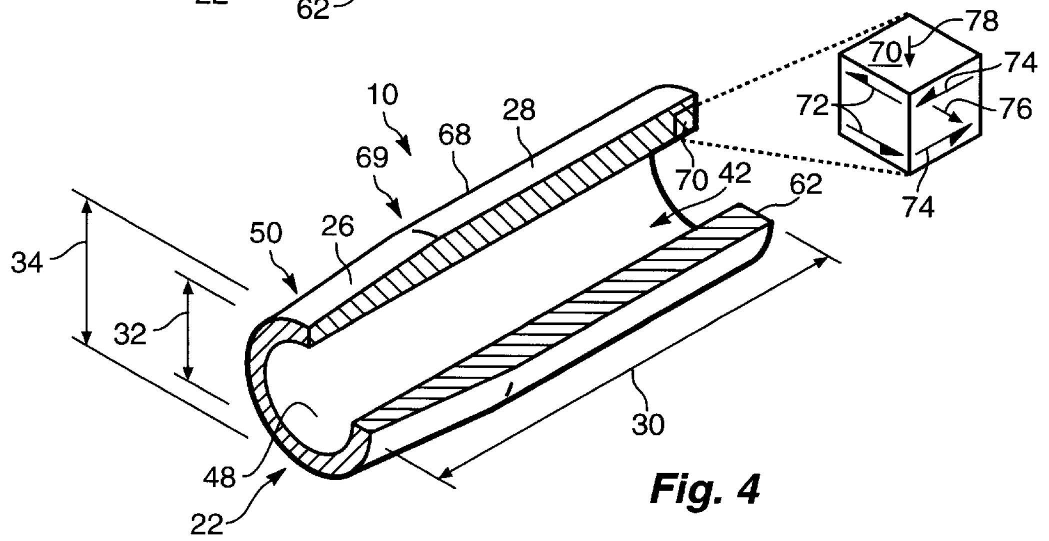
FIG. 4 is a partially cutaway, perspective view of one presently preferred embodiment of a grip of an apparatus in accordance with the invention.

Referring to FIG. 4, a presently preferred embodiment of the grip 10 is illustrated as an alternative embodiment 68. Each of the embodiments 10, 40, 64, 28, may be referred to as a grip 10. In the embodiment of FIG. 4, the tapered section 26 of the grip 10 provides minimization of the outer diameter 34 at the head end 22. Accordingly, the shoulder 69 becomes the first location, proceeding longitudinally 11*a* from the head end 22 to the base 24, at which the maximum value of the diameter 34 is reached.

Referring to FIGS. 1–4, one may see that several inches of the length 30 of the typical handle 20 and the grip 10 may pass into a holster or other holder having a dimension (e.g. width of passage) too small to fit the maximum value of the outer diameter 34 of the grip 10 in the straight portion 28. Moreover, since the tapered portion 26 has the same treatment as the straight portion 28, or may, in one preferred embodiment, the tapered portion 26 tends to grip and resist effectively falling or moving out of a pocket or holster.

Thus, the implement 12 or apparatus 12 may penetrate a holster to a greater depth, and resist with a significant and effective force, removal. Nevertheless, intentional removal by a user may be effected very simply by grasping the base end 24 of the grip 10 and withdrawing the tool 12 from a holster, belt, etc.

A stress cube 70 is instructive to understand what is happening within the wall 46 of the grip 10. For example, a right-handed user gripping the grip 10 may turn the grip in a clockwise direction 11*c*, viewed from the base 24. Accordingly, a shear 72 may then be imposed in a circumferential-radial plane. Similarly, thrust imposed in a longitudinal direction 11*a* on a surface 50 may impose a shear 74 in a longitudinal-radial plane. Shear distribution normal to the planes 73,75 may be somewhat more complex.

At the outermost surface 50, shear must be zero in a force balance when not in use.

Meanwhile, near the aperture 42, or cavity 42, the grip 10 will be in circumferential tension due to the interference fit between the handle 20 and the grip 10. A tensile force 76 is applied normal to the face 75 of the cube 70. Similarly, a compressive stress 78 (load and stress may be used somewhat interchangeably with force, although, technically, stress is a force distributed over an area) will be applied to the face 77 of the cube 70. Again, stress is distributed and relieved by distortion within the grip 10, and the representative stress cube 70. At the outermost surface 50 of the grip 10, the compressive stress 78 must necessarily be zero in a force balance analysis.

In an apparatus and method in accordance with the invention, the material selected for the grip 10 is most effective if selected to provide a desired balance between the modulus of elasticity, governing the stress and strain relationship within the solid material of the ridges 58, the void fraction of the cells 60, or the cavities 54, and ridges 58 compared volumetrically, the maximum elongation, and a stiffness to permit a selected amount of distortion under a torque load (in a circumferential direction 11*c*). The grip 10, and specifically an individual stress block 70 must support the shear 72 rather than merely collapsing the void fraction (e.g. the cavities 54 in the cells 60). Prior art expanded polymeric materials are typically used as bumpers, padding, and the like. Application of torsional loads (e.g. converted into shear 72, 74) is nominal and insufficient to transmit torque effectively into a handle 20.

By contrast, a grip 10 in accordance with the invention, maintains a sufficient value of compression 78 against the handle 20 to support a friction force in a circumferential direction 11*c*. The void fraction of the cells 60 is sufficiently low to support the shear 72,74. The voids 54 in the cells 60, opened by working the surface 50 of the grip 10, permit substantial intrusion by the flesh of a hand of a user.

Thus, in addition to applying a compression 78 to the outer surface 50, the hand of a user may provide mechanical interaction, independent from friction, to the convoluted surface 50 of the grip 10. Moreover, compression 78 by the hand of a user against a surface 50 creates depressions which are effective to resolve forces applied by a user to maintain the entire component acting in a circumferential direction 11*c*, or a thrust direction 11*a* in a longitudinal direction 11*a*. The balance between the material properties of a material selected for the grip 10 may drastically influence the operation thereof In one currently preferred embodiment, a neoprene polymer, which may be augmented by other additives in certain embodiments, may be manufactured to pass certain performance standards according to the American Society for Testing Materials (ASTM). For example, a material manufactured to be tested under the standard ASTM D-1056, meeting a classification of SCE-45, and under the standard ASTM D-1056-91 with a classification of 2CS, has been shown to be effective for the grips 10. The density may range between 35 and 55 lbs per cubic foot. A range of compression deflection of from about 17 lbs per square inch to about 24 lbs has been found satisfactory. Chemical resistance to petroleum distillates may be important in certain applications. Accordingly, neoprene and neoprene compounds have been shown to be suitable in most applications.

Figure 5:
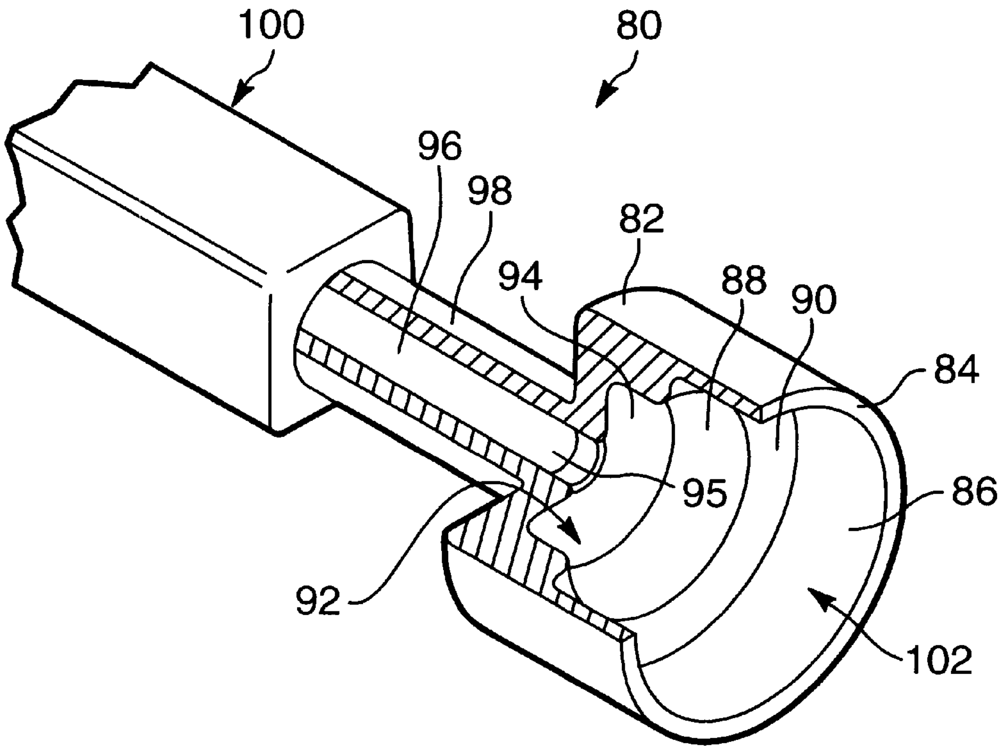
FIG. 5 is a partially cutaway, perspective view of a fixture for applying a grip, in accordance with the invention, to a handle.

Referring to FIG. 5, a fixture 80 may be provided for installing the grip 10 on a handle 20. In one presently preferred embodiment, a base 82 may provide structural strength and resistance to deflection. A rim 84 may be provided to orient the grip 10 with respect to the handle 20 and with respect to the base 82.

For example, an inner surface 86 may contact the outer surface 50 of a grip 10. Nevertheless, in one presently preferred embodiment, a clearance may be provided between the surface 50 of the grip 10 and the inner surface 86 of the rim 84. The rim 84 simply serves to guide or orient the base 24 of the grip 10.

A surface 88 may be offset from the surface 86 to provide a seat 90 for supporting the grip 10 against movement in a longitudinal direction 11*a*. The surface 88, thereby forms a plenum extending in a longitudinal direction 11*a* away from the seat 90. The plenum 92 provides space for air to be injected into the cavity 42 of a grip 10 positioned against the seat 90.

In one embodiment, one or more ports 95 may provide a flow of fluid, such as compressed air, from a channel 96 into the plenum 92. Accordingly, the plenum 92 provides to a cavity 42 of a grip 10, a supply of pressurizing air to expand the inner surface 48 of the grip 10 away from the handle 20, sufficiently to facilitate insertion of the handle 20 into the grip 10.

The channel 96 in a conduit 98 may connect to a controller 100. A controller 100 may be formed to operate manually, automatically, pneumatically, electronically, or on any other basis to provide a fluid through the channel 96 to the plenum 92.

Figure 6:
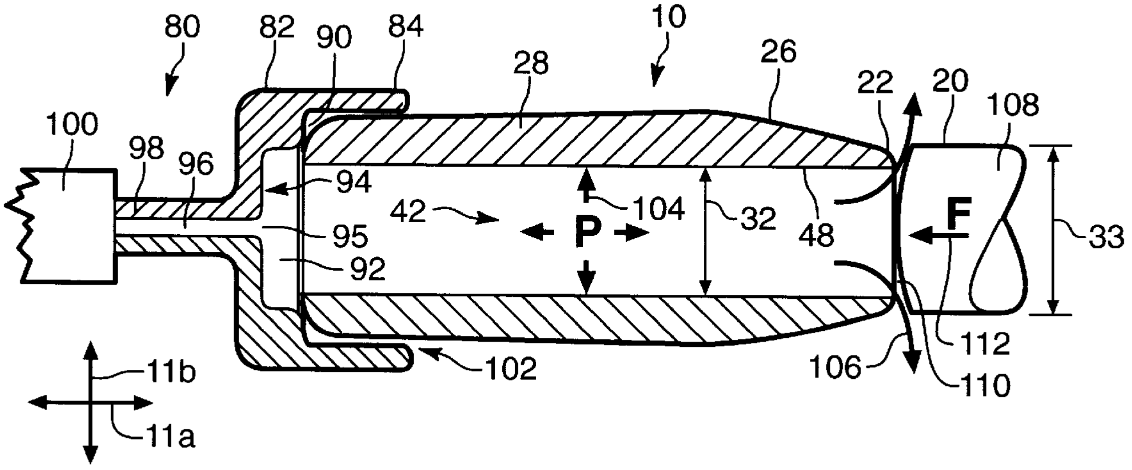
FIG. 6 is a side, elevation, sectioned view of an apparatus, in accordance with the invention, illustrating a tool handle grip, and installation fixture.

Referring to FIG. 6, specifically, while referring to refer to FIGS. 1–5, a fixture 80 may be used by placing a grip 10 against the seat 90 to effectively form a seal. The seal between the base 24 of the grip 10 need not be absolute. For example, some leakage is permissible. Sufficient pressure may be provided from the plenum 92 to pressurize the cavity 42 of the grip 10, expanding the inner diameter 32 for receiving the handle 20.

For example, pressure 104 may be communicated from the channel 96 to the plenum 92, and on to the cavity 42 of the grip 10. However, in one presently preferred embodiment of an apparatus and method in accordance with the invention, a handle 20, and specifically an outermost surface 108 of a handle 20, and more specifically a base 110 of a handle 20 may be positioned against a head 22 of the grip 10, to form a substantially fluid tight seal thereat. Again, the seal formed by the head 22 and the base 110 need not be absolute. However, the sealing effect of the base 24 of the grip 10 against a seat 90, and the base 110 of the handle 20 against the head 22 of the grip 10, should be sufficiently effective to maintain the pressure 104 at substantially the same value as the plenum 92.

The pressure 104 has the effect of increasing the internal diameter 32 of the grip. The pressure 104 may be selected to be sufficient to expand the inner diameter 32 and to expand the outer diameter 34 of the grip 10. However, expansion of the outer diameter 34 is not necessary. Depending on the thickness 44 of the wall 46 (e.g. see FIG. 2), and the void fraction of the cells 60, the entire deflection attributed to the pressure 104 may be attenuated before substantial stress or deflection is transmitted to the outermost surface 50. However, in another embodiment, a substantial deflection of the inner diameter 32 of the grip 10 may transmit stress and strain (load and deflection) to the surface 50, increasing the outer diameter 34.

One effect of deflecting the entire grip 10 outward in a radial direction 11*b* is to pre-load the innermost surface 48 of the cavity 42 and the surface 108 of the handle 20. Pre-loading includes not only the elastic compression of the material of the wall 46 of the grip 10, but the transmitted stress residually remaining nearer the outermost surface 50 of the grip.

For example, a stress cube 70, viewed at the outermost surface 50, may have no compressive stress 78 until a user applies such. However, a substantial tensile stress 76 may be applied due to stretching of the grip 10 in order to fit the handle 20 inside the cavity 42. The residual stress 76 near the surface 50 tends to load the stress block 70 that exists at the surface 48.

Thus, additional friction may exist to engage the surface 48 against the surface 108. Such a frictional load may be significant. Moreover, since such a frictional load may be preexisting, a user need not apply and transmit stresses and loads at the outermost surface 50 sufficient to provide the frictional engagement between the surface 48 and the surface 108.

This principle is a major difference between certain embodiments of an apparatus and method in accordance with the invention, as compared with prior art applications of elastomeric, expanded polymers. One may think of residual tensile stresses 76 in the grip 10 as providing an additional rubber band or wrap further loading and gripping the inner surface 48 of the cavity 42 against the outer surface 108 of the tool handle 20.

Moreover, because of an interference designed between the outer diameter 33 of the handle 20, and the unloaded inner diameter 32 of the grip 10, additional compressive forces 78 exist in a stress block 70 near the surface 48.

Another benefit of the residual stresses 76 acting in a circumferential direction 11*c* in the grip 10 is to pre-load the grip 10 such that a torsional load (e.g. in a circumferential direction 11*c*) applied by a hand of user to the outer surface, will be transmitted through the wall 46 and to the surface 108 of the tool handle 20 effectively. Thus, manufacture, installation, and use of a grip 10 in association with a tool 12 or apparatus 12, are integrated and inter-dependent processes in certain embodiments.

Referring to FIG. 6, and generally to FIGS. 1–16, a pressure 104 may be applied inside the cavity 42 of a grip 10, from the plenum 92. A handle 20, and more particularly the base 110 effectively seals the head 22 of the grip 10, while the seat 90 effectively seals the base 24 of the grip 10 as a pressurized chamber. Upon pressurization of the inner surface 48, the inner diameter 32 expands. Depending upon the thickness 44 of the wall 46, and the exact composition of the material in the wall 46, as well as the maximum value of the pressure 104, the outer diameter 34 may also expand.

A force 112 applied to the handle 20 maintains a sealing effect, but may also apply a compressive load to the head 22, complementing the pressure 104 to force expansion of the head 22. Meanwhile, the force 112 urging the handle 20 into the cavity 42 drives the handle 20 toward the stop 94. In practice, escape of air from the cavity 42 through the path 106 will tend to further expand the diameter 32 about the diameter 33 of the handle 20. Moreover, the escape of air over a smooth surface 108 will tend to float the surface 48 of the cavity 42 along the surface 108 of the handle 20 on a fluid bed equalizing pressure completely around the handle 108.

However, in practice, even handles 20 that are not completely smooth along the surface 108 have been found to be mountable in grips 10 effectively, by the process and apparatus 80 of FIG. 6. Due to the interference of the outer diameter 33 with the inner diameter 33 and the flexibility of the material in the grip 10, the surface 48 may tend to stretch across flat or even concave portions of the surface 108, maintaining a substantial fluid seal. Sufficient sealing capacity is provided to support the pressure 104, maintaining the expansion of the inside diameter 32.

Another observation in assembling the handle 20 and the grip 10 involves the speed with which the resilience or elasticity of the grip 10 acts. In certain embodiments, the material of the grip 10 may be selected to provide a delay in resilience upon deflection. For example, maintaining a grip 10 at a cooler temperature tends to result in a more lethargic elastic response than, for example, deflecting the grip 10 at a comparatively warmer temperature.

Thus, assembly at or below room temperature, actually provides a slight delay in the return of the inside diameter 32 to fit the outer surface 108 of the handle 20. The delay results in a reduction of friction, temporarily during installation, between the surface 108 and the surface 48. This delay may be used at great advantage during assembly while providing substantial benefit later by relaxing to apply greater stress between the surfaces 48, 108.

Figure 7:
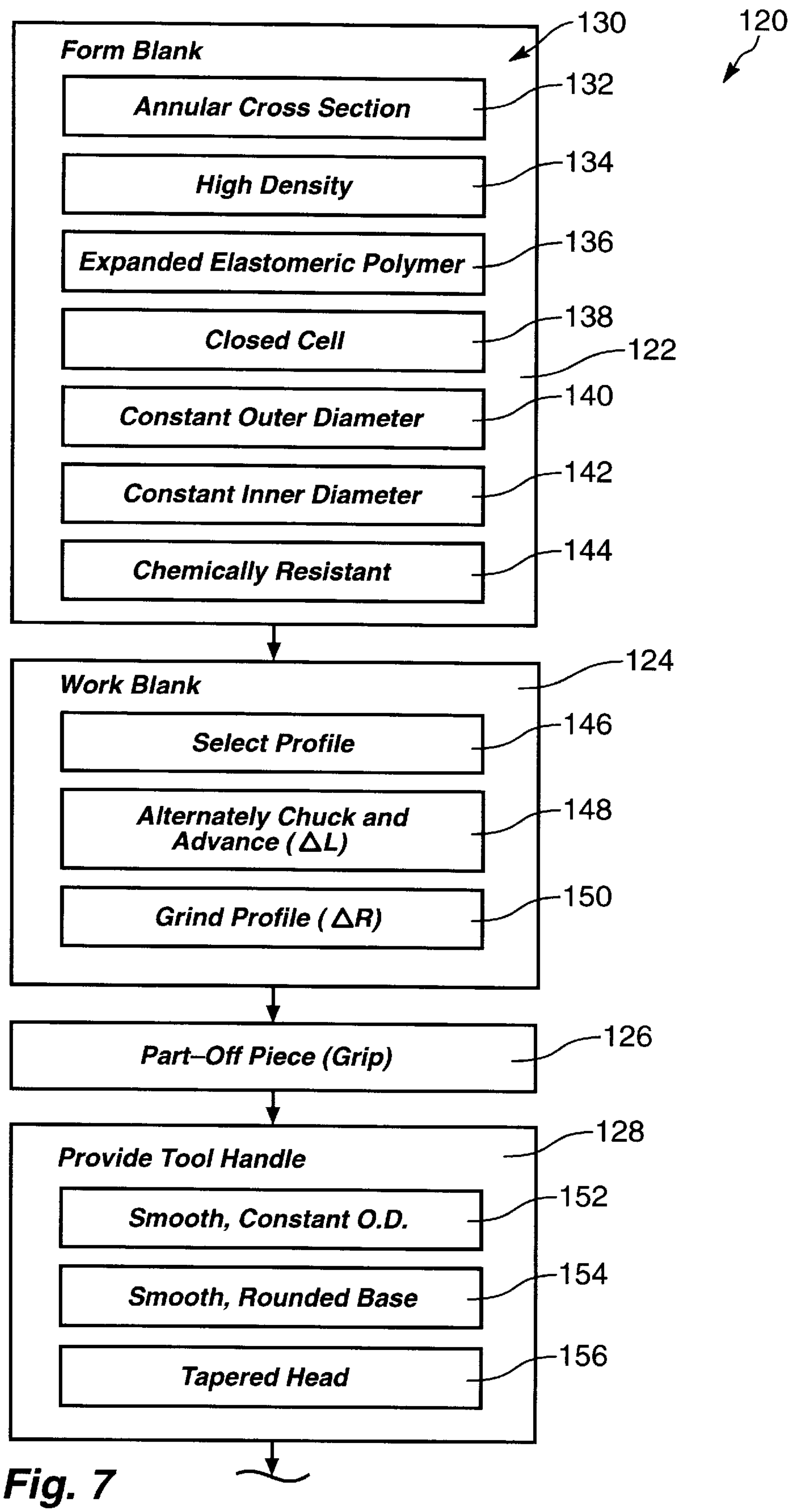
FIG. 7 is a schematic block diagram of one embodiment of a manufacturing process for making grips in accordance with the invention.

Referring to FIG. 7, a process 124 for manufacturing the grip is illustrated along with certain optional characteristics. For example the process 120 may include a form step 122 involving forming a blank 40. The form step 122 may be accomplished by extrusion, in one currently preferred embodiment, or may use injection molding, pultrusion, or the like.

A form process 122 or form step 122, may, but need not, include any of the formation steps 130. Thereafter, a work step 124 or working step 124 may be used to work the surface 50 of the blank 40. In one embodiment, a grinding operation may be used to open cells 60 in an otherwise closed-cell, expanded, polymeric blank 40 or elastomeric blank 40. The work blank step 124 may be followed by a parting step 126 or part-off piece step 126.

The parting off 126 need not be included if the blank 40 is injection molded. However, an extrusion may be made more economically in long pieces which may then be parted off 126 as individual blanks 40. A provide step 128 may be accomplished by numerous methods. The provide step 128 may involve any or all of the steps in providing a tool handle 20 for engagement with the grip 10. The provide step 128 need not be simultaneous in time or space with the steps 122,124,126.

In certain presently preferred embodiments, a form step 122 may include steps 132–144, singly or together. Any combination thereof may be appropriate. However, in certain presently preferred embodiments, a step 132 for providing an annular cross-section has been found useful, as is providing a comparatively high density material 134 in the blank 40. A step 136 forming an expanded elastomeric polymer, and, providing such expanded material by a step 138 for forming closed cells, provided several advantages, including durability, resilience, and imperviousness to fluids and other contaminates.

Forming 140 a constant outer diameter 34 is not required but enables the use of extrusion processes. Similarly, forming 142 a constant inner diameter 32 is not required, but enables inexpensive extrusion. Finally, forming 144 chemically resistant materials into the shape of a blank 40 is useful in many applications of tools that may be exposed to petroleum distillates, acids, and the like.

The work process 124 may include selection 146 of a profile. The profile of a blank 40 may be that of a right circular cylinder. Nevertheless, an alternative profile, such as those illustrated in FIGS. 3,4, and the like, may be used.

A work step 148 involving chucking followed by holding and advancing a blank 40 in a longitudinal direction 11*a* may be used for implementing a more sequential process of working 124 and parting off 126. For example, following a parting-off step 126, an extruded blank 40 of substantially longer length than the length 30 of a finished grip 10, may be unchucked (released from a gripper, chuck, etc.), advanced an appropriate length to be worked 124, and then gripped or chucked again for completion of the grind step 150.

The grind step 150 may be any cutting step. Grinding has been found effective for the materials selected for other reasons for use in the grips 10. The provide step 128 may, but need not, provide 152 a smooth, constant, outside diameter 33 for the tool handle 20. Similarly, the provide step 154 may, but is not required to, provide a smooth, rounded base 110 for the rounded handle 20.

Providing 156 a tapered head 21, may be very beneficial. However, providing 156 a taper angle 38 or an extension to a handle 20 that protrudes longitudinally 11*a* away from the head 22 of the grip 10, is not an absolute requirement. Nevertheless, the providing 156 of a tapered head 21 has been shown to be very effective in supporting easy insertion and withdrawal of a tool 12 from a work holster, apron, pocket, or the like.

Figure 8:
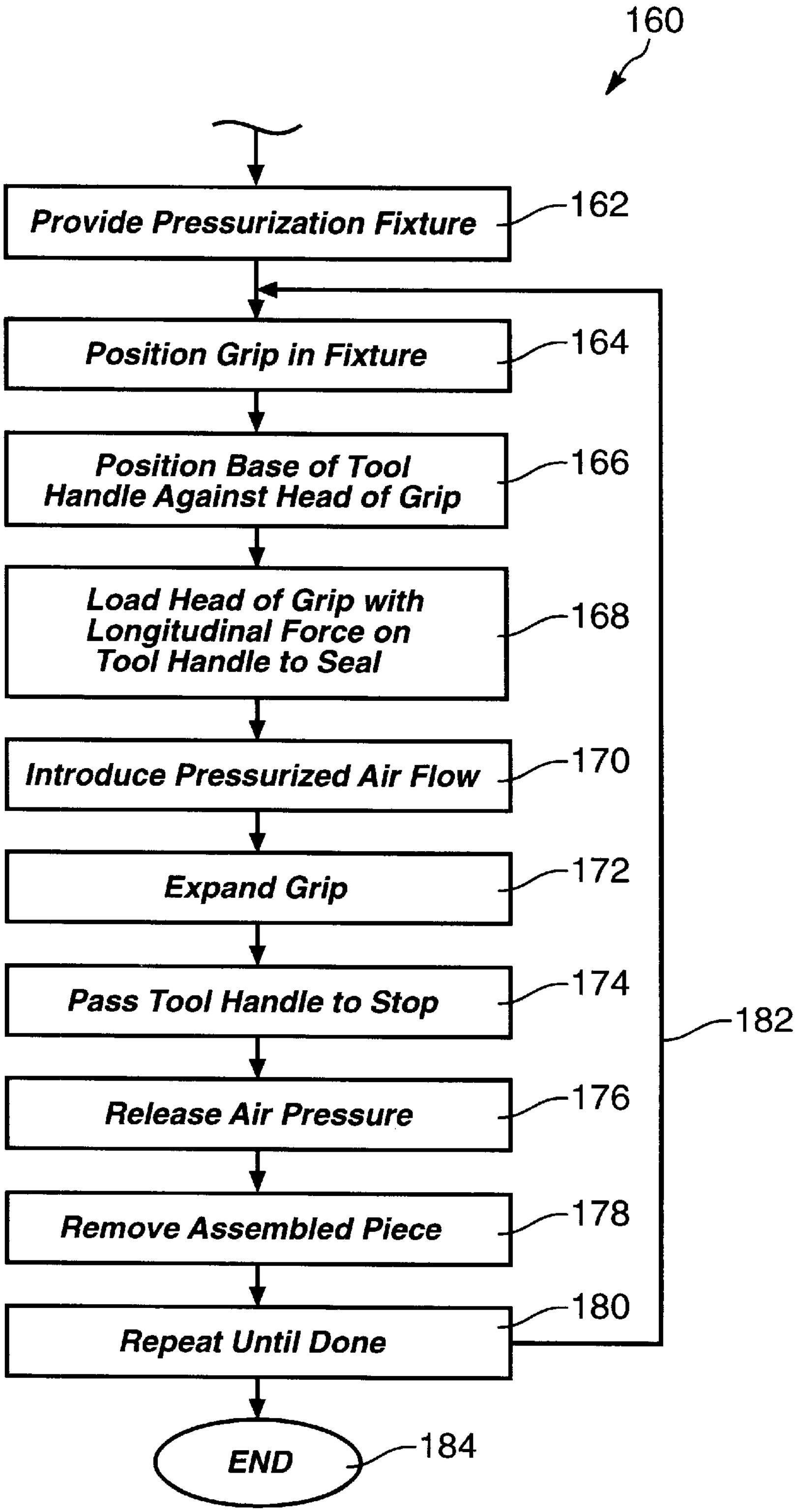
FIG. 8 is a schematic block diagram of a method and process for installation of grips, made in accordance with the invention, on tool handles.

Referring to FIG. 8, a process 160 or assembly process 160 may be used for integrating a handle 20 and grip 10, using a fixture 80. Providing 162 the pressurization fixture 80 may be completed as described previously. Nevertheless, alternative methods of providing 162 fixtures 80 having somewhat different geometries to effect a wrapped and simple insertion of a tool 20 into a grip 10, may be considered.

A position step 164 may be completed automatically or manually to place a grip 10 in a fixture 80. Thereafter, a position step 156 may position a base 110 of a handle 20 of a tool 12 against a head 22 of a grip 10 in the fixture 80.

A load step 168 may apply a force 112 to a handle 20 positioned against the head 22 of the grip 10. The force 112 should be sufficient to smoothly, rapidly, and effectively move the base 110 of the handle 20 to the stop 94. The stop 94 may be positioned flush against the base 24 of the grip 10. The stop 94 may be offset in a longitudinal direction 11*a*, in order to expose the base 110 to a hand of a user when desired.

An introduce step 170 or pressurizing step 170 may provide air from a controller 100 through a channel 96 to the plenum 92 by a port 95. Thus, a pressure 104 may be provided within the cavity 42 of the grip 10. In response to the pressurization 170, an expand step 170 reflects the response of the surface 48, and the inside diameter 32 of the grip 10 to the pressure 104.

A pass step 174 or insert step 174 translates the base 110 of the handle 20 toward, and into contact with, the stop 94, through the cavity 42 of the grip 10. The expand step 142 may or may not place the outer surface 50 of the grip 10 in contact with the inner surface 86 of the rim 84 of the fixture 80.

Finally, a release step 176 may relieve the pressure 104 in the plenum 92. Leakage may relieve the pressure 104, following a cessation of a flow through the channel 96 from the controller 100. A remove step 178 may be easily effected by withdrawing the grip 10, containing the handle 20, from the cavity 102 within the rim 84 of the fixture 80. Depending on the clearance between the rim 84 and the outer surface 50 of the grip 10, force may or may not be required to be exerted in a longitudinal direction 11*a* to effect the release 176.

A repeat step 180 may return 182 to a position in the process 160 implying selection of a particular grip 10 for positioning 164 within the fixture 80. Upon completion of assembly of a quantity of grips 20 and handles 20 selected, the process 160 may end 184. The processes 120, 160 of FIGS. 7–8 may be displaced from one another in time or space. Alternatively, the processes 120, 160 may occur in sequence, at the same location.

Figure 9:
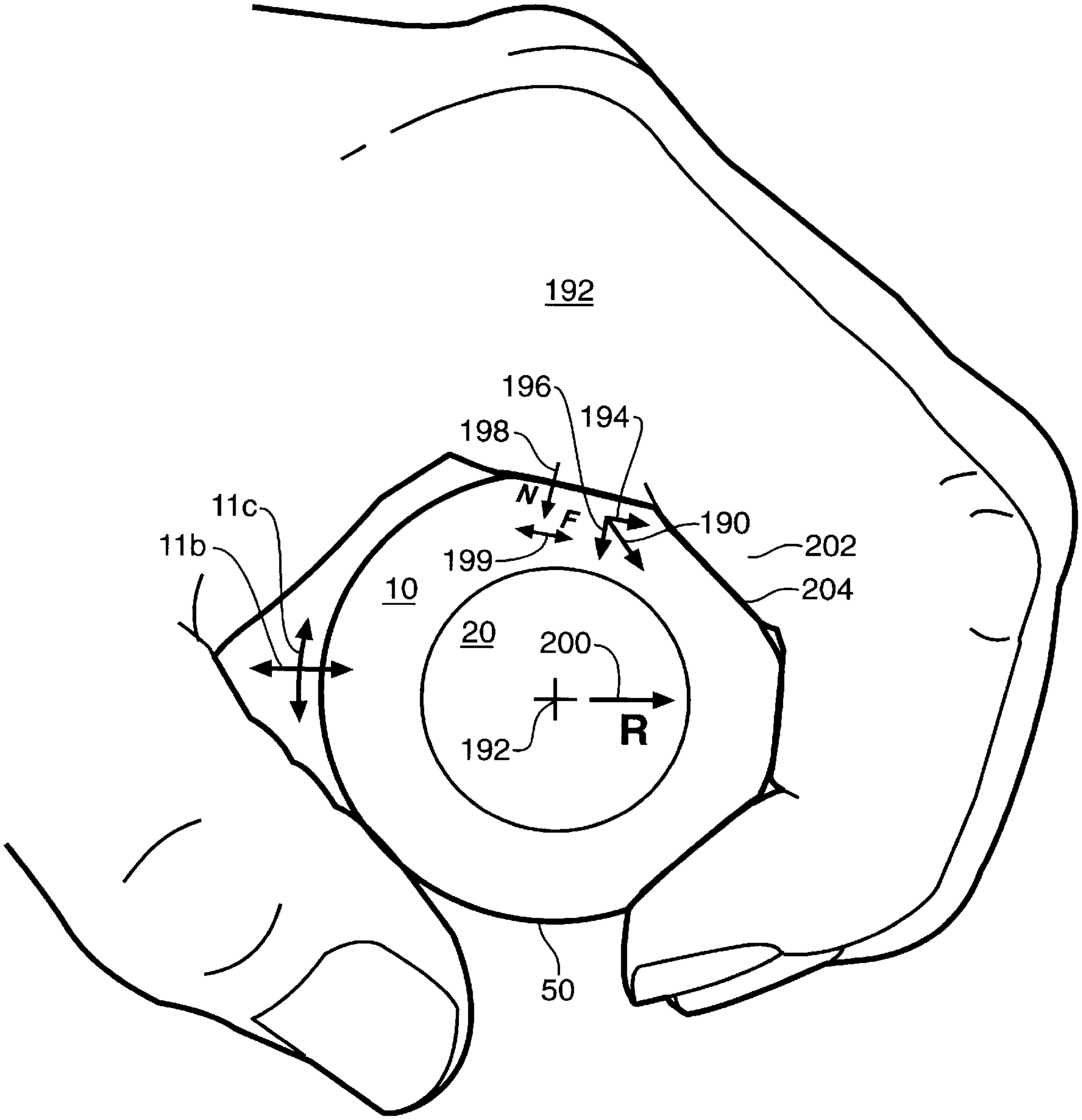
FIG. 9 is an end elevation view of an apparatus in accordance with the invention, illustrating certain principles of operation thereof in the hand of a user.

Referring to FIG. 9, a tool 12 or apparatus 12 may be engaged by the hand 191 of a user to thrust in a longitudinal direction 11*a* along a center line 192 or to rotate the handle 20 in a circumferential direction 11*c* about the center line 192. The center line 192 may be thought of as a longitudinal axis 192.

In use, a force 190 may be directed against an outer surface 50 of a grip 10. The force 190 maybe resolved into a circumferential component 194 and a radial component 196, with respect to the center line 192. However, because the surface 50 of the grip 10 may be distorted, by application of a force 190 against a surface 50, the hand 191 may apply a normal force 198, perpendicular to the surface 50 as depressed, compressed, distorted, deflected, etc. by the hand 191.

A component 199 or force 199 may be applied by the hand 191 in a direction substantially parallel to any surface 50, in any direction that the surface 50 may extend. For example, a depression in a surface 50, may still have a normal 198 and parallel 199 component of force applied thereto. As described above, the cell 60 may provide substantially greater parallel components 199 to forces 190 applied by fingers of a user's hand 191.

However, a more gross effect is the resolution of forces applied, at the surface 50, to the distorted portions of the surface 50. That is, a radius 200 at which a hand 191 applies force to the grip 10, may depend on the amount of force locally available at the surface 50 from the hand 191. Thus, the tissue 202 of a hand 191 of a user may distribute force or pressure from an interior bone of a hand 191 to a surface 204 of the hand in contact with the surface 50 of the grip 10. The open cells 60 in selected embodiments of a grip 10, in accordance with the invention, may supersede friction and exceed the forces of friction available in a parallel force 199 applied by the hand 191 to the surface 50.

However, independent of the intrusion of the tissue 202 of a hand 191 into the cavities 54 of the cells 60, depression of the surface 50, conformal to a surface 204 of a hand 191 provides flattened 248 or even concave portions 248 of the surface 50. Accordingly, a normal component 198 of force tends to compress in a radial direction 11*b*, the surface 50. However, the resolution of the parallel force 199, may result in additional and substantial application of a force 194 or component 194 in a circumferential direction 11*c* about the center line 192.

In fact, the Poisson effect amounts to substantially a conservation of mass. Accordingly, compression (e.g. normal force component 198) may result in expansion in other directions, forcing elevation 250 of the surface 50 about any depression 248. Thus, depression of the surface 50 may result in a barrier 250 nearby, further contributing to application of force in a circumferential direction 11*c*.

Figure 10:
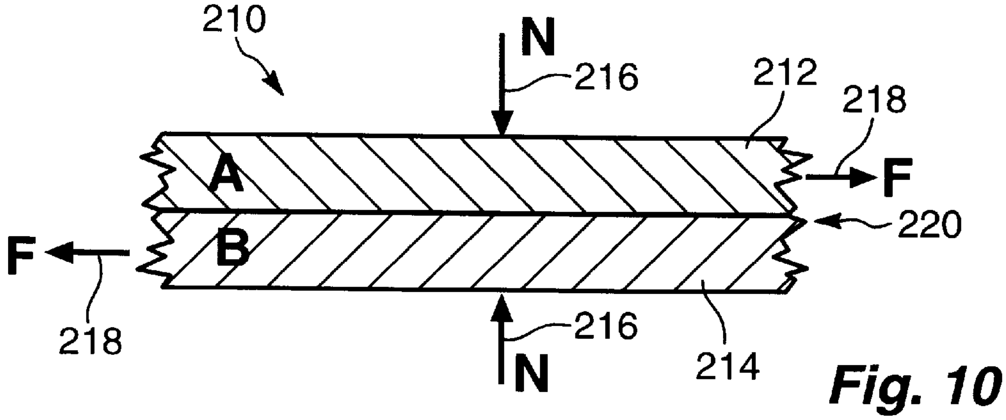
FIG. 10 is an end elevation, sectioned view of materials in frictional contact in accordance with certain aspects of the invention.
Figure 11:
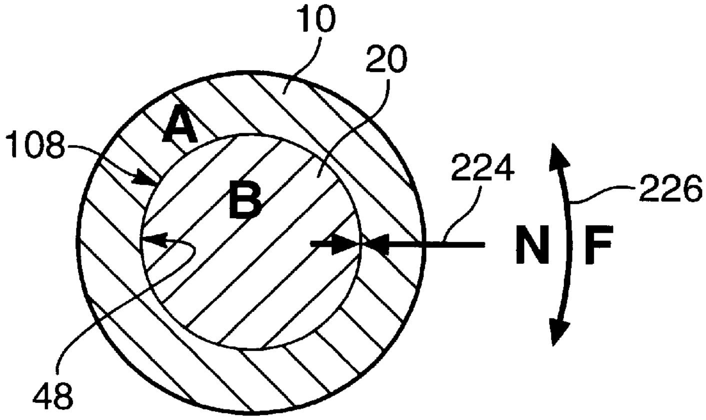
FIG. 11 is an end elevation sectioned view of an apparatus in accordance with the invention illustrating certain principals of friction applied thereto.

Referring to FIG. 10, friction may contribute to the parallel force component 199. For example, viewing an engagement element 210 schematically as a portion of any two materials 212, 214, application of a normal force 216 therebetween will support and resist a force 218 parallel to an engagement region 220, or engagement surface 220 between the two materials 212, 214. The relationship between the force 218 and the normal 216 or normal force 216 (normal is perpendicular) is a constant for smooth surfaces. A coefficient of friction exists, defining the proportionality between the force 218 and the normal 216 at the engagement region 220 (e.g. contact surface 220).

Figure 13:
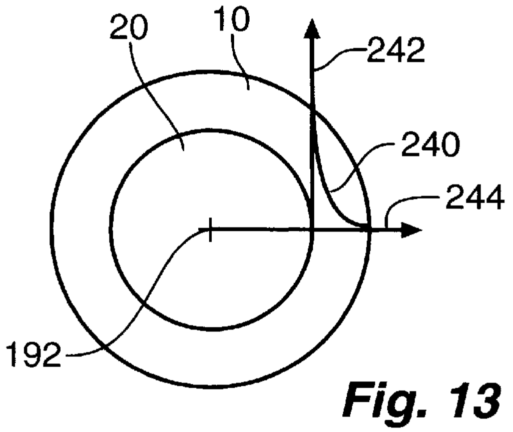
FIG. 13 is an end, elevation, sectioned view of an apparatus in accordance with the invention, in accordance with the invention, illustrating a stress distribution in one embodiment of a grip.
Figure 14:
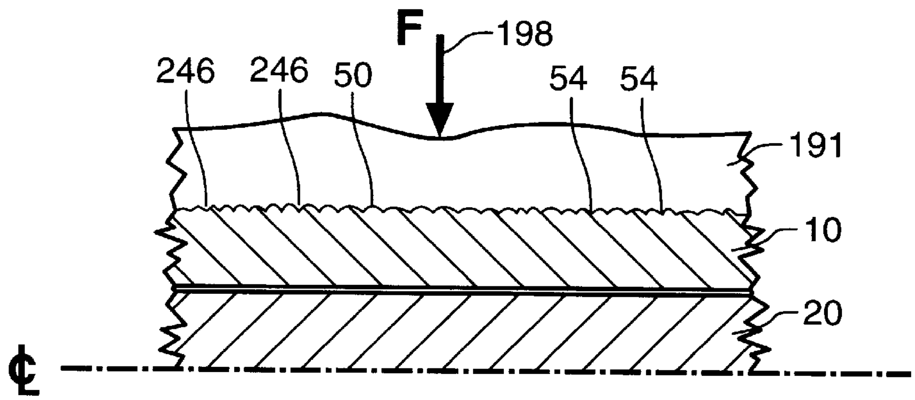
FIG. 14 is a side, elevation, sectioned view of certain surface features giving rise to interactions between the hand of a user, a grip in accordance with the invention, and a tool handle in accordance with the invention.
Figure 15:
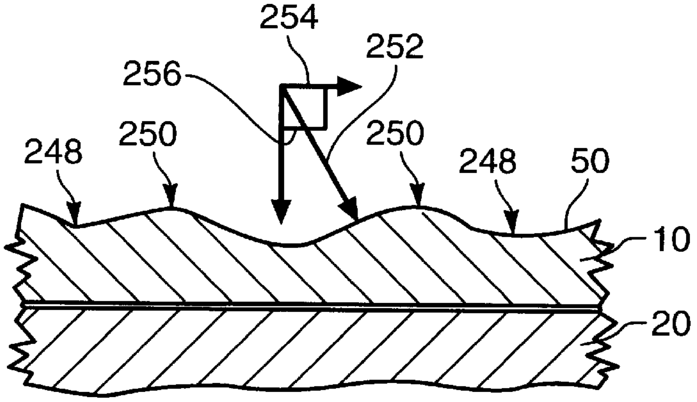
FIG. 15 is an end, elevation, sectioned view of a grip in accordance with the invention and a tool handle in accordance with the invention illustrating certain principles of operation associated with a deflection as illustrated in FIG. 9; and, FIG. 16 is a partially cutaway, side, elevation view of an apparatus in accordance with the invention in a holder or holster.

Referring to FIGS. 13, as well as FIGS. 13–15, generally, one may see that the frictional principles may apply to the surface 50 of the grip 10, but apply virtually exclusively in certain embodiments of a grip 10 on a handle 20. For example, a normal force 224 may be applied at the surface 108 of the handle 20, by the surface 48 of the grip 10. As described above, compression 230 in a radial direction 11*b* of the surface 48 by the intrusion of the surface 108 maintains both the compressive load 230 natural to the material of the grip 40 as well as the additional load imposed by the tensile stresses 232 residual in the grip 40 in a circumferential direction 11*c*.

Any force 190 applied by a user, contributes to the normal force 224. Thus, the surface 108 of the handle 20 is triple-loaded by interference compression 230 of the surface 48 in a radial direction 11*b*, tension 232 in the circumferential direction 11*c* of the grip 10, and any additional force 190, 198, 199 resolved as a normal force 196 in a radial direction 11*b*.

Accordingly, a torque or force 226 operating on a lever arm corresponding to some radius 200 at a surface 108, of handle 20, and at a surface 50 of a grip 10, due to action of a hand 191 of a user, may be sustained at a much greater value than in other prior art handles 20 or grips 10. The effective normal load 224 is increased, permitting application of a substantially greater circumferential force 226 or torque 226.

Engagement by the hand 191 due to intrusion of the tissues 202 thereof into the voids 54 of the cell 60 as well as resolution of the forces 198, 199 in the stable, depressed surface 50 (e.g. see FIG. 9) contribute to substantially improved gripping by the hand 191 for applying the force 226 or torque load 226 to the grip 10. Due to the triple loading and the mechanical limits on elastic deflection the depressions 248 cannot deflect enough to fail by excessive distortion. Instead the depressions 248 and rises 250 become temporary contours for grippin, engaging, circumferential components of force. Thus, a user may apply substantially greater torque, and thrust, which operates in substantially the same manner, to a workpiece through a shaft 14 or other engagement member from a handle 20 of a grip 10. A residual outside diameter 34 of approximately double the outside diameter 33 has been shown to be effective. Less causes a reduction in transmitted torque. More tends to result in ultimate strength failures in the grip material. A value of 25 percent is very effective and durable.

The pre-loaded grip 10 is unitary, not requiring outer wrapping, outer materials auxiliary to the surface 50. The grip 10 relies on no glues along the surfaces 48,108, no knurling of the surface 108 of the handle 20, and other treatments commonly required as in conventional attempts to improve the effective grip of a user or application of a force 226 of a user to a workpiece through a tool 12. The unitary construction of the grip 10, by proper selection and use of materials, void fractions, installation dimensionalities, the pressure 104, the diameters 32,33,34, and the like may all be selectively used to formulate a method 120 of manufacture, and a method 160 of installation for achieving virtually any performance criterion or limitation desired.

Figure 12:
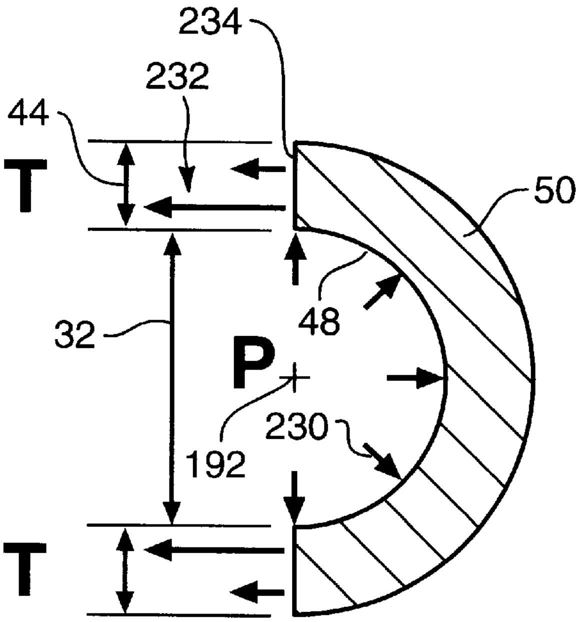
FIG. 12 is an elevation sectioned view of a grip in accordance with the invention illustrating certain forces acting thereon.

Referring to FIG. 12, a further explanation of the stress distributions within a grip 20 may be visualized. For example, pressure 230 may be viewed as corresponding to the pressure 104 or the compressive load (pressures) 230 applied by the surface 108 to the grip surface 48. For example, in pressure vessel design, a pressure 230 integrated across a diameter 32 forms a substantial load. The load from the integration of the pressure 230 is resisted, restrained, or balanced, by the integration of a tensile load 232 within the material.

A free body surface 234 may be thought of as an artificial construct provided in order to analyze the internal tension 232. Due to the Poisson effect, and other principles of stress distribution, including, to a certain extent, the closed-cell construction in selected embodiments, the compressive pressure 230 due to interference by a handle 20 in the cavity 42, may be exacerbated by the tension 232. Maximum stress limits in a material may be reached due to a force in a first direction. At a lower value, if the same sense (e.g. tension, compression) of force is applied orthogonal thereto simultaneously. Due to the thickness 44 of the wall 46 of the grip 10 (e.g. see FIG. 2), the tension near the surface 108 may be greater than that nearer the surface 50.

Referring to FIG. 13, a stress distribution 240 is illustrated. A value 242 of the stress 240 varies with respect to a position along a radius 244. The stress 240 may represent tensile stress in a circumferential direction 11*c*, and may represent a compressive, residual stress operating in a radial direction 11*b*. The stress distribution 240 may be designed by selecting the material, void fraction dimensions, inner diameter 32, outer diameter 34, modulus of elasticity, yield, and the tool handle diameter 33.

Figure 16:
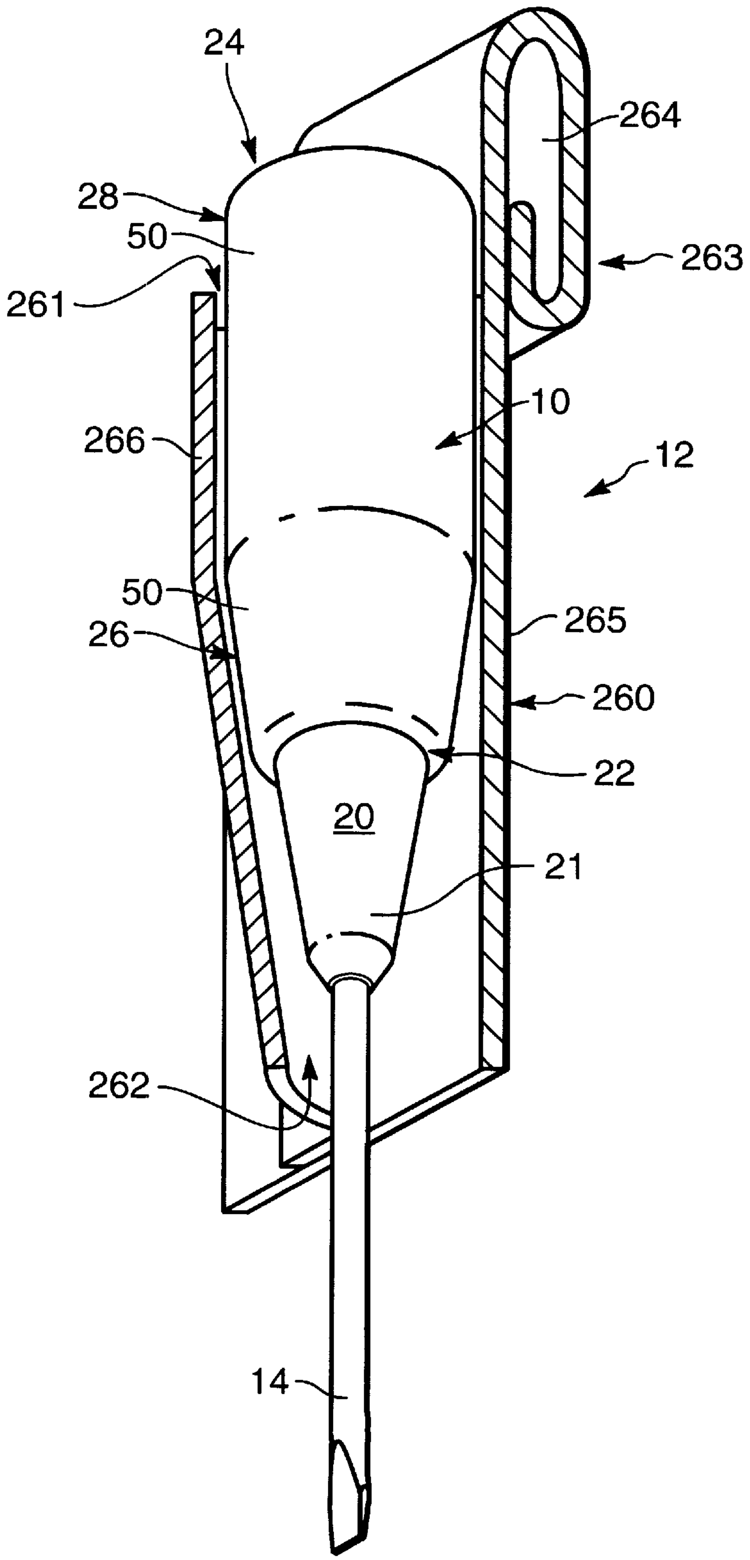

Referring to FIGS. 14–16, certain details of the grip 10 are illustrated in support of certain descriptions of operations herein. For example, a hand 191 may be impressed against a surface 50 of a grip 10. However, the grip 10 has voids 54 into which intrusions 246 of the tissue 202 of a hand 191 are impressed. Accordingly, a force 198, applied to a surface 50 of a grip 10 by a user, may support a substantially greater parallel force 199 (see FIG. 9), by direct mechanical interaction, rather than relying on friction, as does the interaction between the grip 10 and the tool handle 20.

In FIG. 15, a gross interaction between a surface 50 of a grip 10, and a hand of a user is illustrated by the depressions 248 and associated rises to 50 caused by application of force from a hand 191 to the surface 50. For example, a hand 191 will fit into the depressions 248, and against the rises 250. Moreover, any force 252, normal to the surface 50 may be resolved into a radial component 256, with respect to the center line 192 of the handle 20, and a circumferential component 254 with respect to the center line 192.

Similarly, any force 190 applied, may be so resolved. That is, a hand 191 will apply a force 190 in a direction. The force may contribute to radial compression of the surface 50 of the grip 10. The force may also contribute to distortion of the surface 50 into depressions 248 and rises 250. The force may also contribute to a normal force giving rise to a frictional force parallel to the surface 50.

Thus, even absent the combined effect of the voids 54 and ridges 58 of the cells 60, (e.g. see FIGS. 2, 14), surface friction forces against the material of the surface 50 may be substantial, and the gross effect of the depressions 248 and associated bridges 250 arising under the Poisson effect (e.g. conservation of mass, related to volume), may provide a resolution of a normal force 252 into a radial compression component 256, and a circumferential or longitudinal component 254 effecting rotation (torque or thrust).

The balance between the modulus of elasticity of the basic material, effective modulus of elasticity due to the void fraction of the closed-cells 60, and the closed-cell construction (balloons) itself, frictional coefficients, micro-pressure concentrated on the ridges 58 against the hand 191 of a user, intrusion of the flesh 202 of a hand 191 into the voids 60, creation of ridges 250, depressions 248 and seating in the depressions 248 by a hand 191 grossly intruding into the surface 50 etc., all contribute to a grip 10 capable to applying more torque to a workpiece than is available by any other prior art handle gripped by a user to effect torque loads, A grip 10 operates extremely effectively in providing thrust in a longitudinal direction 11*a* as well.

Referring to FIG. 16, holsters, pockets, straps, and other devices exist to restrain or maintain tools 12 in close proximity to the hands of a user for prompt access to a user during work. A holster 260 or holder may have an open end 262 or a closed end 262. In the illustration of FIG. 16, an open end 262 is positioned opposite an opening 261 for receiving the tool 12.

Dropping tools is a common problem for people who use them. Accordingly, a holster 260 may be made more uniformly, more economically, and generally more satisfactory. Moreover, existing holsters 260 may be used more for effectively holding tools 12 manufactured to have a tapered portion 21 of the handle 20 and the tapered portion 26 of the grip 10. The holster 260 or holder 260 may include a wrap 263 or loop 263 formed to provide an aperture 264 throughout which a belt or other supporting device (e.g. clips, rods, etc.), may be threaded to support several holsters 260 or pockets 260 for a selected aray of tools 12. The holster 260 may have a back plane 265 or base 265 to which convolutions of materials such as fabric, leather, metal, and the like are secured. For example, a harness 266 may wrap around a tool 12 including a portion of the handle 20 and grip 10. The harness 266 functions to secure the tool 12 within the opening 261, and against the base 265. Typically, a certain amount of restriction, tension, compression, or the like may be exerted against the tool 12. As a practical matter, the tapered section 26 of the grip 10, as well as the tapered section 21 of the handle 20 may be designed to improve intrusion of the tool 12 into the holster 260. One may note when comparing the outer diameter 34 of the grip 10 near the base 24 with the harness 266. If the design of the handle 20, and particularly the tapered portion 21, were instead provided with a thumb rest from the solid material of the handle 20, the diameter near the tapered portion 21 would be approximately be the same as the outer diameter 34 proximate the base 24 of the grip 10. Accordingly, intrusion of the tool 12 into the holster 260 would be severely limited.

Frictional forces applied by the harness 266 and the base 265 to the outer surface 50 of the grip 10 may be somewhat controlled by the user. For example, the force with which a user thrusts the tool 12 into the holster 260 may affect compression of the outer surface 50 of the grip 10, and thus effect the compression, or mechanical engagement of the outer surface 50 of the grip 10 by the harness 266 and base 265.

The foregoing discussion clearly demonstrates that the present invention may provide several advantageous individual features and combinations thereof. The invention provides, for example, a durable grip with superior effectiveness in transmitting greater torque comfortably from a user to a workpiece, limited by strength, not friction.

The present invention may be embodied in other specific forms without departing from the structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed and desired to be secured by united states letters patent is:

What is claimed is:

1. An apparatus for fitting over a handle, the apparatus comprising:

an annulus formed of a closed-cell, elastomeric material having a center and being formed to extend in a radial direction with respect to the center, in a longitudinal direction between a base and a head, and in a circumferential direction substantially orthogonal to the longitudinal and radial directions;

an inner surface of the annulus formed to receive and contact a handle in substantially circumferentially fixed relation therewith;

an outer profile of the annulus along the longitudinal direction;

an outer surface forming a plurality of open voids, each void being substantially bounded by a ridge extending radially away from the center, wherein the voids are formed by selectively opening- cells in the closed-cell elastomeric material;

the outer surface formed to receive into the void a protrusion of a surface of a hand of a user for engaging the ridge in a circumferential direction; and the outer surface, wherein the elastomeric material has a coefficient of elasticity selected to depress the ridges into a surface of a hand of a user a distance effective to engage the ridge in a circumferential direction to comfortably support completely a maximum torque selected by and applicable by a user.

2. A grip for a handle, the grip comprising:

an annulus formed of a closed-cell, elastomeric material, extending in a radial direction, longitudinal direction, and circumferential direction from a center;

an inner surface of the annulus stretched elastically to receive a handle and apply a frictional force thereto in a circumferential direction in response to a radial elastic force applied by the annulus;

an outer surface of the annulus having selectively opened cells formed for embedding in a surface of a hand of a user;

a body extending between the inner surface and the outer surface, the body being formed of a material having an effective elasticity selected to deflect selectively to form a thrust region of the outer surface and define a depression associated therewith for receiving a portion of a hand of a user substantially protruding thereinto;

the thrust region formed to resolve a force applied by a portion of the hand of a user into a radial force and a circumferential force selected by a user;

the body, wherein the material is selected to deflect selectively to form the depression, limit the radial and circumferential deflection of the thrust region, and transfer substantially the entire circumferential component of the force to the handle.

3. The grip of claim 2, wherein the annulus is formed of an expanded, closed-cell polymer and the outer surface is formed to present a plurality of open voids, each void being substantially bounded by a ridge extending radially away from the center;

the outer surface further adapted to provide an effective diameter corresponding to the ridge, the effective diameter selected to receive into the void a protrusion of a surface of a hand of a user for engaging the ridge in a circumferential direction.

4. The apparatus of claim 3, wherein the ridge is formed from a material having a coefficient of elasticity selected to depress a surface of a hand of a user a radial distance selected to engage the ridge in a circumferential direction.

5. The apparatus of claim 3, wherein the cells and the ridges are sized to maximize torque applicable by a user.

6. An apparatus for fitting over a handle, the apparatus comprising:

an annulus formed of a closed-cell, elastomeric material having a center and extending in longitudinal and radial directions;

an inner surface of the annulus formed to receive and contact a handle in substantially circumferentially fixed relation therewith;

an outer surface of the annulus forming a plurality of cells formed by selectively opening cells in the closed-cell elastomeric material;

the outer surface, wherein the cells are sized and formed to receive protrusions of a surface of a hand of a user for engaging ridges bounding the cells; and the elastomeric material, having a coefficient of elasticity selected to depress the ridges into a surface of a hand of a user a distance effective to engage the ridge in a circumferential direction.

* * * * *